United States Patent
Rabovitser et al.

(10) Patent No.: US 6,289,851 B1
(45) Date of Patent: Sep. 18, 2001

(54) COMPACT LOW-$NO_X$ HIGH-EFFICIENCY HEATING APPARATUS

(75) Inventors: Iosif K. Rabovitser, Skokie; Richard A. Knight, Brookfield; Hamid A. Abbasi, Naperville, all of IL (US)

(73) Assignee: Institute of Gas Technology, Des Plaines, IL (US)

( * ) Notice: Subject to any disclaimer, the term of this patent is extended or adjusted under 35 U.S.C. 154(b) by 0 days.

(21) Appl. No.: 09/691,755

(22) Filed: Oct. 18, 2000

(51) Int. Cl.[7] .............. F23M 3/04; F22B 31/04
(52) U.S. Cl. ........ 122/95.2; 122/240.2; 432/82; 431/5; 431/10
(58) Field of Search .............. 122/367.2, 95.2, 122/235.35, 240.1, 240.2; 432/73, 82; 431/5, 10, 9, 116, 351, 353

(56) References Cited

U.S. PATENT DOCUMENTS

| | | |
|---|---|---|
| 3,789,805 | 2/1974 | Williams . |
| 3,838,652 | 10/1974 | Schol . |
| 5,161,488 * | 11/1992 | Natter ........................ 431/5 |
| 5,437,248 | 8/1995 | Miura et al. . |
| 5,690,482 * | 11/1997 | Shessel et al. ............ 431/5 |
| 5,799,621 | 9/1998 | Gordon et al. . |
| 5,849,059 * | 12/1998 | Quirk et al. ............... 431/5 |
| 5,894,819 | 4/1999 | Motegi . |
| 5,941,697 * | 8/1999 | Chaouki et al. ........... 431/5 |

* cited by examiner

Primary Examiner—Gregory Wilson
(74) Attorney, Agent, or Firm—Pauley Petersen Kinne & Fejer

(57) ABSTRACT

A multi-stage heating apparatus having a first stage combustion chamber, a second stage combustion chamber, a primary porous matrix chamber disposed between the first and second stage combustion chambers, a secondary porous matrix chamber, heat exchanger tubes for transfer of heat from the combustion products to a working fluid, a recirculation device for recirculating combustion products in the first and second stage combustion chambers to the root of flames therein. A mixture of fuel and primary oxidant is introduced into the first stage combustion chamber, and the products of combustion therein are conveyed to the porous matrix chamber disposed between the first and second stage combustion chambers. After undergoing intensive heat transfer in the porous matrix chamber, the cooler products of combustion flow into the second stage combustion chamber forming additional products of combustion. The products of combustion then flow to a second porous matrix chamber in which they undergo further intensive heat transfer. From there, the products of combustion pass through an economizer for preheating a working fluid and through a condenser for removing moisture in the combustion products prior to being exhausted.

26 Claims, 2 Drawing Sheets

COMPACT LOW-$NO_x$ HIGH-EFFICIENCY HEATING APPARATUS

BACKGROUND OF THE INVENTION

1. Field of the Invention

This invention relates to a process for combustion of a gaseous and/or liquid fuel which has the potential for increasing thermal efficiency and reducing $NO_x$ emissions from conventional heating apparatuses such as boilers and other fluid heaters, and which makes possible the use of boilers and other fluid heaters having a reduced size in comparison to conventional boilers and fluid heaters having a comparable thermal rating. More particularly, this invention relates to heating apparatuses which employ porous matrix beds similar to those used in porous matrix surface combustors, differing from said surface combustors in that the flame normally present in the surface combustor is removed to a free space upstream of the porous matrix bed, which allows conventional flame detection and control and facilitates turndown.

2. Description of Prior Art

In conventional types of fluid heaters, the combustion chamber occupies most of the volume of the heating apparatus, thereby undesirably affecting the performance and the cost of the heating apparatus. Accordingly, it is desirable to develop a small but highly efficient fluid heater. U.S. Pat. No. 5,482,009 teaches two methods for reducing the volume of a boiler occupied by a furnace to nearly zero.

The first of these methods is a high intensity surface combustion method which attains high intensity surface combustion by use of a premixed burner and a tube nested combustion chamber in which the combustion and heat transfer are attained by causing the flame from the burner to penetrate into a nest of water tubes. A compact boiler comprising a water tube-walled combustion chamber and a forced draft convective heat exchange section disposed downstream of the combustion chamber comprising a helical coil assembly is taught by U.S. Pat. No. 5,259,342. Combustion is carried out in stages and, in accordance with at least one embodiment, flue gas recirculation is employed wherein the recirculated flue gases are introduced into the burner combustion air.

The reduction of $NO_x$ emissions from combustion processes and apparatuses is a long-standing, major environmental objective. As a result, numerous strategies for reducing the $NO_x$ emissions from combustion processes have been developed. One such strategy is the use of staged combustion in which the fuel or combustion air is introduced into the combustion apparatus in two or more stages, thereby maintaining flame temperature below a threshold temperature required for significant formation of $NO_x$ in the combustion process. U.S. Pat. No. 5,080,577 teaches a method and apparatus for staged combustion within porous matrix elements in which a fuel and source of oxygen are mixed and combusted in at least two successive combustion zones filled with a porous matrix. The first combustion zone is fuel-rich and the second combustion zone is fuel-lean. The use of fuel-rich conditions in the first stage of a staged combustion method and apparatus reduces the potential for $NO_x$ formation by ensuring that there is substantially no free oxygen available to combine with nitrogen which may be present in the first combustion stage and by maintaining a temperature in the first stage of the combustion process below the temperature at which $NO_x$ is formed, typically about 1800° F. U.S. Pat. No. 4,878,830 teaches a staged combustion method and apparatus in which a fuel is burned in the first stage under fuel-rich conditions and the temperature of the products of combustion are controlled by a heat transfer device disposed between the primary and secondary combustion zones downstream of which secondary combustion oxygen is introduced into the apparatus for completing combustion. Similarly, U.S. Pat. No. 5,645,413 teaches a method and apparatus for low $NO_x$ combustion in natural draft combustion chambers comprising a staged-air combustion apparatus and process in which a fuel-rich, fuel-air mixture is introduced through a burner into a combustion chamber, forming a fuel-rich primary combustion zone flame which is attached to a flame guide disposed substantially parallel to the longitudinal axis of the primary combustion zone flame. The flame guide provides for removal of heat from the primary combustion zone flame. Secondary combustion air is introduced into the combustion chamber downstream of the burner to complete the combustion of the fuel-rich primary combustion zone flame products. To stabilize the fuel-rich combustion zone flame, combustion gases are internally recirculated within the combustion chamber into the fuel-rich primary combustion zone flame. U.S. Pat. No. 5,709,541 teaches a staged combustion process in which the first stage is fuel-rich, secondary combustion air is introduced downstream of the primary combustion zone and the combustion gases are internally recirculated into the fuel-rich primary combustion zone. Heat is removed from the combustion process by means of process tubes disposed within the combustion zones. In U.S. Pat. No. 5,052,921, a gas-fired burner is operated at substantially sub-stoichiometric conditions to produce products of combustion rich in combustibles and control flame temperatures at temperatures which do not exceed predetermined levels. Completion air is subsequently employed to complete combustion. Regenerative and recuperative means are used to cool gases after each partial combustion step.

Yet another method for controlling $NO_x$ emission is the use of recirculated flue gases. U.S. Pat. No. 5,044,932 teaches a process and apparatus for reducing $NO_x$ content of the flue gas effluent from a furnace comprising a burner assembly having a burner and flue gas recirculating system for collecting and passing internally recirculated flue gas into a combustion zone for reaction with a combustion flame and comprising a wall tube system for removal of heat.

Staged combustion in combination with removal of heat by heat exchange means is taught by U.S. Pat. No. 4,395,223 wherein both the primary and secondary combustion zones are fuel-lean, U.S. Pat. No. 4,013,399 which teaches burning fuel in a primary combustion chamber under fuel-rich conditions and passing the combustion products through a secondary combustion zone into which more air is injected wherein the combustion zones are surrounded by a group of water filled tubes, and U.S. Pat. No. 4,867,674 which teaches a method in which a process medium is heated in two stages wherein fuel oil and gas premixed with air are partially burned in a primary combustion chamber under fuel-rich conditions downstream of which additional combustion air is mixed with the combustion products from the primary combustion chamber to complete combustion of the unburned portions.

SUMMARY OF THE INVENTION

It is one object of this invention to provide a boiler or process heater having a reduced size and higher thermal efficiency relative to conventional boilers and process heaters with comparable thermal outputs.

It is another object of this invention to provide a boiler or process heater which is compact in size compared to conventional boilers and process heaters.

It is yet another object of this invention to provide a compact boiler or process heater having reduced $NO_x$ emissions relative to comparable known boilers and fluid heaters.

These and other objects of this invention are addressed by a high efficiency heating apparatus comprising a first stage combustion chamber having an inlet for a fuel-oxidant mixture and a first stage combustion products outlet, a second stage combustion chamber having a combustion products outlet and a combustion products inlet in fluid communication with the first stage combustion products outlet, a primary porous matrix chamber disposed between the first and second stage combustion chambers having a primary matrix combustion products inlet in fluid communication with the first stage combustion products outlet and the primary matrix combustion products outlet in fluid communication with the second stage combustion products inlet, a secondary porous matrix chamber having a combustion products outlet and a combustion products inlet in fluid communication with the second stage combustion products outlet, heat exchange means for transferring heat from the combustion products to a working fluid, which heat exchange means is disposed in each of the combustion chambers and porous matrix chambers, recirculation means for internally recirculating combustion products to the root of a flame present in each of the first and second stage combustion chambers, and at least one of secondary fuel means secondary combustion oxidant means for introducing at least one of a second portion of said fuel and a secondary combustion oxidant into the second stage combustion chamber. By the term "high efficiency" heating apparatus, we mean a heating apparatus comprising heat exchange means having a heat-transfer rate greater than or equal to about 100,000 Btu/h-ft². As will be discussed in further detail hereinbelow, the apparatus of this invention may also include a condenser for removing vapor from the products of combustion exiting the secondary porous matrix chamber, an economizer disposed between the secondary porous matrix chamber and the condenser, and a combustion oxidant preheater for preheating at least one of the primary combustion oxidant and the secondary combustion oxidant.

In operation, a mixture of fuel and primary oxidant is introduced into the first stage combustion chamber and ignited, forming a flame and products of combustion. At least a portion of the products of combustion is internally recirculated to a root of the flame and at least a portion of the first stage heat generated by the flame is removed from the first stage combustion chamber. The products of combustion are then introduced into a primary porous matrix chamber comprising a radiating material surrounding at least one heat exchanger tube containing a working fluid to be heated, thereby cooling the products of combustion and heating the working fluid. The cooled products of combustion and at least one of a second position of said fuel and a secondary combustion oxidant is introduced into a second stage combustion chamber, forming a second stage flame and additional products of combustion. At least a portion of the heat generated by the second stage flame is removed from the second stage combustion chamber and at least a portion of the products of combustion in the second stage combustion chamber is recirculated to the root of the second stage flame. The products of combustion from the second stage combustion chamber are then introduced into a secondary porous matrix chamber comparable to the primary porous matrix chamber resulting in further cooling of the products of combustion, which products of combustion are then exhausted from the secondary porous matrix chamber.

In accordance with one embodiment of this invention, the air-to-fuel ratio of the mixture of fuel and primary oxidant introduced into the first stage combustion chamber is such as to produce a fuel-rich environment in the first stage combustion chamber. The primary combustion oxidant which is introduced into the first stage combustion chamber is an oxygen-containing fluid selected from the group consisting of air, oxygen and oxygen-enriched air. The secondary combustion oxidant which is introduced into the second stage combustion chamber is an oxygen-containing fluid selected from the group consisting of air, oxygen, oxygen-enriched air, and flue gases.

In accordance with another embodiment of this invention, the air-to-fuel ratio of the mixture of fuel and primary oxidant introduced into the first stage combustion chamber is such as to produce fuel-lean conditions in the first stage combustion chamber. In this case, a second portion of fuel, optionally with additional oxidant, is introduced into the second stage combustion chamber.

BRIEF DESCRIPTION OF THE DRAWINGS

These and other objects and features of this invention will be better understood from the following detailed description taken in conjunction with the drawings wherein.

DETAILED DESCRIPTION OF PREFERRED EMBODIMENTS

The objects of the invention claimed herein are to increase the thermal efficiency, reduce $NO_x$ emissions, and reduce the size of boilers and other fluid heaters compared to conventional boilers and fluid heaters with comparable thermal output. The method of this invention is applicable to boilers having natural or once-through circulation, boilers which utilize saturated or super heated steam, boilers which are gaseous or liquid fuel-fired, and boilers which utilize forced or natural draft, and fluid heaters which are gaseous or liquid fuel-fired, which utilize forced or natural draft, and which heat fluids such as water, oil, thermal fluid, chemicals, petroleum or other types of fluids.

Figure 1:
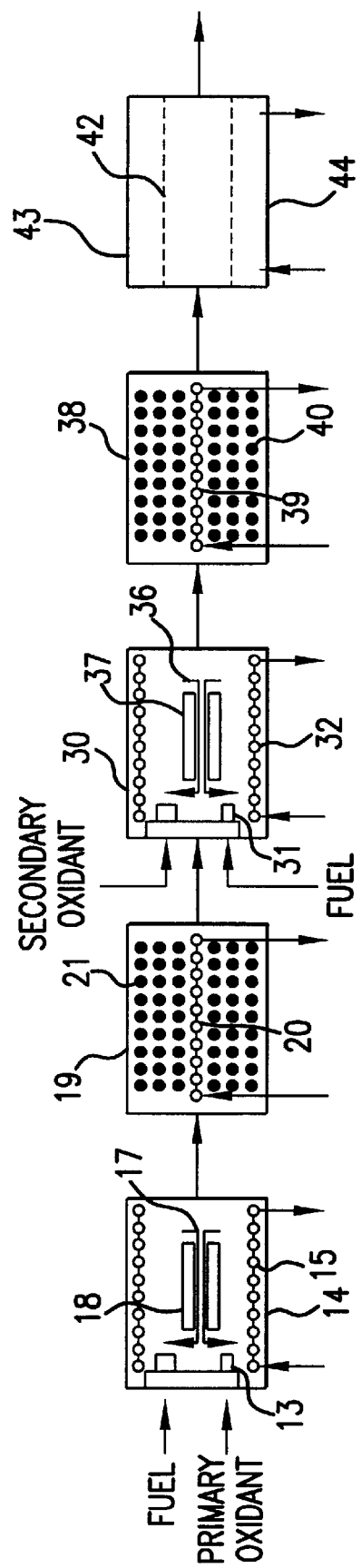
FIG. 1 is a schematic diagram of the elements of a compact boiler or process heater in accordance with one embodiment of this invention displayed in a linear fashion so as to more clearly show the relationships between the combustion and porous matrix chambers of the compact boiler or process heater of this invention.

As shown in FIG. 1, fuel, which may be a liquid or gaseous fuel but preferably is a gaseous fuel and more preferably is natural gas, is mixed with a primary oxidant comprising any oxygen-containing fluid and injected through one or more fuel/primary oxidant nozzles 13 into a primary or first stage combustion space 14 formed at least partly by heat-exchanger tubes 15 containing a fluid to be heated. The fuel/primary oxidant mixture is burned in the first stage combustion space 14, forming combustion products. A portion of the combustion products from the first stage combustion chamber having been cooled by the heat exchanger tubes 15 is internally recirculated as shown by arrow 17 into the root of the flame extending from fuel/primary oxidant nozzle 13 by use of a recirculation means 18 to help stabilize the combustion and to reduce the peak flame temperature so as to reduce $NO_x$ formation.

The products of combustion produced in the first stage combustion chamber 14 are conveyed into a primary porous matrix chamber 19 comprising heat exchanger tubes 20 which are surrounded by a radiating material 21. The radiating material 21 surrounding heat exchanger tubes 20 increases the rate of heat transfer from the products of combustion to the heat exchanger tubes 20, thereby enabling reduction in the overall size of the heat exchanger. Suitable radiating materials include, but are not limited to, refractory chips or balls. By virtue of this configuration, a significant amount of heat is removed from the products of combustion in the primary porous matrix chamber. As a result, the temperature of the products of combustion entering the second stage combustion chamber 30 is reduced, which, in turn, reduces $NO_x$ formation in the second stage combustion chamber 30.

The cooled combustion products from the primary zone, which is made up of the first stage combustion chamber 14 and the primary porous matrix chamber 19, are mixed with at least one of a second portion of fuel and a secondary oxidant comprising any fluid containing oxygen, such as air, oxygen-enriched air, oxygen, or flue gases, and injected into second stage combustion chamber 30 through one or more nozzles 31. Second stage combustion chamber 30, like first stage combustion chamber 14, is formed at least partly by a plurality of heat exchanger tubes 32 containing the fluid to be heated. The mixture of fuel and/or secondary oxidant and the products of combustion from the primary zone is burned in second stage combustion chamber 30 with a minimal amount of excess air to ensure complete combustion of the fuel. A portion of the products of combustion in the second stage combustion chamber 30 are cooled by the second stage heat exchanger tubes 32 and internally recirculated, as indicated by arrow 36, back into the root of the second stage flame by use of recirculation means 37 to help stabilize combustion as well as further reduce the second stage flame temperature and limit $NO_x$ formation. The products of combustion from the second stage combustion chamber are passed through a secondary porous matrix chamber 38, which, like primary porous matrix chamber 19, comprises a plurality of heat exchanger tubes 39 surrounded by a radiating material 40, which radiating material may be the same or different from the radiating material utilized in primary porous matrix chamber 19. In this manner, the products of combustion are further cooled, resulting in an increase in system thermal efficiency.

In accordance with one embodiment of this invention, the efficiency of the boiler or process heater is further increased by passing the cooled combustion products from the secondary zone comprising the second stage combustion chamber 30 and the secondary porous matrix chamber 38 into a condenser 43 for removal of water vapor in the secondary combustion products. In accordance with a particularly preferred embodiment of this invention, condenser 43 is a transport membrane condenser (TMC) comprising a semi-permeable membrane 42 sealed inside an outer shell 44. The transport membrane condenser allows water vapor in the second stage combustion products to pass selectively through the semipermeable membrane 42. In the application to a steam boiler, the water vapor is condensed by direct contact with liquid water constituting the working fluid for the boiler, which is then used to produce steam in the boiler. In this way, the latent heat of vaporization is transferred from the second stage combustion products to the working fluid and can be utilized to increase thermal efficiency by contributing to steam production.

Figure 2:
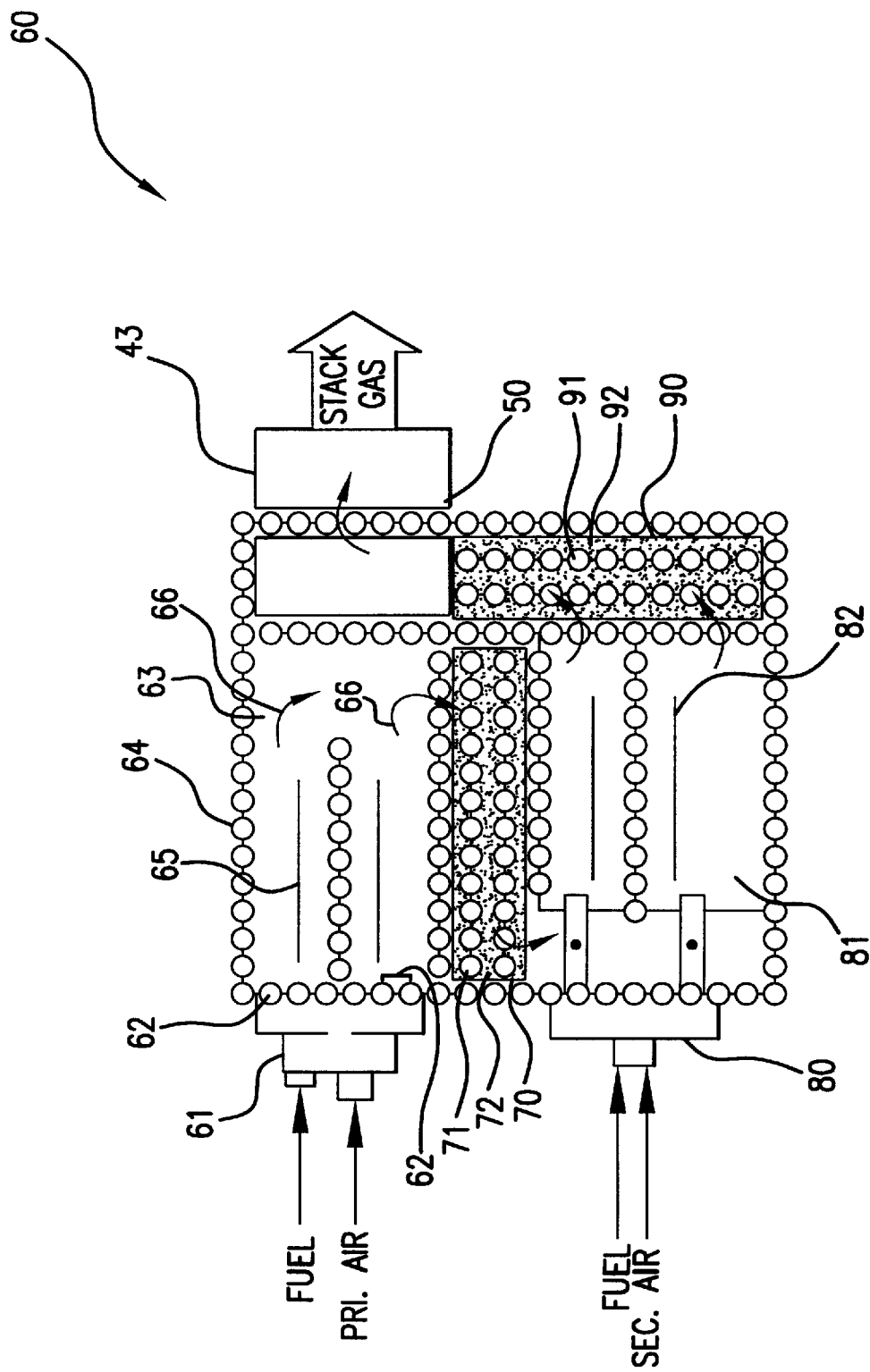
FIG. 2 is a schematic diagram of a plan view of a compact boiler or process heater in accordance with one embodiment of this invention.

In accordance with one embodiment of this invention, a heat exchanger or economizer 50, as shown in FIG. 2, is disposed in the fluid heater whereby the second stage combustion products from secondary porous matrix chamber 38 are conveyed into economizer 50 resulting in a transfer of heat from the second stage combustion products to the boiler feed water or other working fluid. The second stage combustion products are then conveyed into the condenser 43 for the removal of water vapor as described hereinabove. In accordance with another embodiment, the economizer receives second stage combustion products from the condenser. In accordance with yet another embodiment, economizers are disposed both upstream and downstream of the condenser; and, in accordance with yet another embodiment of this invention, a heat exchanger is provided that transfers heat from the second stage combustion products to the primary or secondary combustion oxidant.

Accordingly, the method and apparatus of this invention, combined with the heat removal in the second stage combustion chamber, the low excess air, the cooling of the products of combustion in the primary zone and the mixing of the primary zone combustion products with the secondary oxidant, minimize the formation of $NO_x$ in the second stage combustion chamber.

We have found that the method and apparatus of this invention can reduce the $NO_x$ formation to below 7 vppm (at 3% $O_2$) while also reducing the size of the boiler or fluid heater by at least 20% compared to conventional boilers or fluid heaters.

FIG. 2 shows a configuration for a compact boiler or process heater 60 employing the method of this invention. Fuel and air are premixed in primary plenum 61 from which the mixture is distributed to primary burners 62. The first stage combustion takes place in first stage combustion chamber 63 which is partially formed by heat exchanger tubes 64. Disposed within first stage combustion chamber 63 is recirculation means 65 for recirculating a portion of the combustion products to the root of the flames produced by primary burners 62. The combustion products from first stage combustion chamber 63 are conveyed, as indicated by arrows 66, into primary porous matrix chamber 70 in which a plurality of boiler tubes 71 surrounded by a radiating material 72 are disposed. Intensive heat transfer from the products of combustion entering into the primary porous matrix chamber 70 to the boiler tubes 71 is achieved in primary porous matrix chamber 70. Depending upon the stoichiometry of the air/fuel mixture introduced into the first stage combustion chamber 63, secondary air and/or fuel is introduced into plenum 80 which, in turn, is introduced into second stage combustion chamber 81 in which second-stage combustion occurs. Disposed within second stage combustion chamber 81 are recirculation means 82 for recirculating a portion of the products of combustion present in second stage combustion chamber 81 to the root of the second stage flames. The products of combustion are then conveyed from second stage combustion chamber 81 to secondary porous matrix chamber 90 which, similar to primary porous matrix chamber 70, comprises a plurality of boiler tubes 91 surrounded by a radiating material 92 resulting in additional intensive transfer of heat from the products of combustion to the boiler tubes. The products of combustion from secondary porous matrix chamber 90 are conveyed into economizer 50 in which the products of combustion are further cooled, the heat from which can be used to preheat a working fluid. The cooled products of combustion are then conveyed to condenser 43 for extensive moisture removal prior to being exhausted. If desired, a steam super heater and optional air heater can be accommodated.

As discussed hereinabove, the high efficiency heating apparatus of this invention is a staged combustion apparatus, that is an apparatus in which the fuel and/or oxidant are introduced into the apparatus in two or more portions so as to form a plurality of distinct combustion zones within the apparatus. In the high efficiency heating apparatus of this invention, the first combustion zone comprises the first stage combustion chamber and the primary porous matrix chamber and the second combustion zone comprises the second stage combustion chamber and the secondary porous matrix chamber.

In accordance with one embodiment of this invention, fuel is introduced into the heating apparatus in stages so as to produce a fuel-lean environment in the first combustion zone. Preferably, the amount of fuel introduced into the first combustion zone is in the range of about 70% to about 95% of the total amount of fuel introduced into the heating apparatus at an oxidant/fuel stoichiometric ratio in the range of about 1.2 to about 1.5. Fuel in the amount ranging from about 5% to about 30% of the total amount of fuel introduced into heating apparatus is introduced into the second combustion zone. In accordance with one embodiment, no additional oxidant is introduced into the second combustion zone.

In accordance with another embodiment of this invention, a mixture of fuel and primary oxidant having an oxidant-to-fuel ratio less than the stoichiometric amount required for complete combustion is introduced into the first stage combustion chamber and ignited, forming a flame and products of incomplete combustion. The products of incomplete combustion pass through the first stage combustion chamber and the primary porous matrix chamber into the second stage combustion chamber into which secondary oxidant with no additional fuel is introduced in an amount sufficient to complete combustion of the products of incomplete combustion.

In accordance with yet a further embodiment of this invention, both the fuel and oxidant are introduced into the heating apparatus in stages. In the first combustion zone, fuel and oxidant in an oxidant-to-fuel stoichiometric ratio in the range of about 1.2 to about 1.35 are introduced into the first stage combustion chamber whereby the amount of fuel comprises in the range of about 70% to about 95% of the total amount of fuel introduced into the heating apparatus. Fuel in the amount of about 5% to about 30% of the total amount of fuel introduced into the heating apparatus and oxidant in an oxidant-to-fuel stoichiometric ratio in the range of about 0.1 to about 0.4 are introduced into said second stage combustion chamber.

As shown, a porous matrix heat transfer component is utilized between the primary and secondary combustion stages and again after the secondary combustion stage, and permits intensive energy removal from the fire side to the steam side of the boiler in a small volume by combining radiative, conductive, and convective heat transfer. Experimental studies on a 200,000 Btu/h bench-scale surface combustor consisting of water tubes embedded in a bed of alumina refractory balls have shown high heat-transfer rates of 100,000 Btu/h-ft$^2$, and a high density of energy conversion of up to 800,000 Btu/h-ft$^3$. The temperature of the combustion products above the bed of alumina refractory balls did not exceed 400° F. This allows a significant decrease in overall dimensions of the unit and a very compact heater.

The boiler apparatus of this invention eliminates the disadvantages of surface combustion by removing the flame to a free space (primary or secondary) upstream of each intensive heat transfer region (boiler bank). This allows conventional flame detection and control and facilitates turndown.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A heating apparatus comprising:
    a first stage combustion chamber having a fuel/oxidant premix inlet and a first stage combustion products outlet;
    a second stage combustion chamber having a second stage combustion products inlet in fluid communication with said first stage combustion products outlet and a second stage combustion products outlet;
    a primary porous matrix chamber disposed between said first stage combustion chamber and said second stage combustion chamber having a primary matrix combustion products inlet in fluid communication with said first stage combustion products outlet and a primary matrix combustion products outlet in fluid communication with said second stage combustion products inlet;
    a secondary porous matrix chamber having a secondary porous matrix combustion products inlet in fluid communication with said second stage combustion products outlet and a secondary porous matrix combustion products outlet;
    heat exchange means for transfer of heat from said combustion products to a working fluid, said heat exchange means disposed in each of said first stage combustion chamber, said primary porous matrix chamber, said second stage combustion chamber and said secondary porous matrix chamber;
    recirculation means for recirculating combustion products to a flame root of a flame present in each of said first stage combustion chamber and said second stage combustion chamber disposed in said first stage combustion chamber and said second stage combustion chamber; and
    means for introducing at least one of a secondary combustion oxidant and a secondary fuel into said second stage combustion chamber.

2. An apparatus in accordance with claim 1 further comprising a condenser having a condenser combustion products inlet in fluid communication with said secondary porous matrix combustion products outlet and a condenser combustion products outlet.

3. An apparatus in accordance with claim 2 further comprising an economizer disposed between said secondary porous matrix chamber and said condenser and having an economizer combustion products inlet in fluid communication with said secondary porous matrix combustion products outlet and an economizer combustion products outlet in fluid communication with said condenser combustion products inlet.

4. An apparatus in accordance with claim 2, wherein said condenser is a transport membrane condenser.

5. An apparatus in accordance with claim 2 further comprising a combustion oxidant preheater having a preheater combustion products inlet in fluid communication with said condenser combustion products outlet and heat exchange means for transferring heat from combustion products in said combustion oxidant preheater to at least one of a primary combustion oxidant and a secondary combustion oxidant.

6. An apparatus in accordance with claim 1, wherein said heat exchange means comprises at least one heat exchanger tube for conveyance of said working fluid.

7. An apparatus in accordance with claim 1, wherein a radiating material is disposed in each of said primary porous matrix chamber and said secondary porous matrix chamber, said radiating material surrounding said heat exchange means.

8. An apparatus in accordance with claim 1 further comprising first premix means for premixing a fuel and a primary oxidant in fluid communication with said fuel/oxidant premix inlet and second premix means for premixing products of combustion from said first porous matrix with at least one of fuel and secondary oxidant in second stage combustion chamber.

9. An apparatus in accordance with claim 1, wherein said first stage combustion chamber, said primary porous matrix chamber, said second stage combustion chamber and said secondary porous matrix chamber are disposed within a single enclosure.

10. A boiler comprising the elements of claim 1.

11. A fluid heater comprising the elements of claim 1.

12. A combustion method comprising the steps of:
introducing a mixture of a fuel and a primary oxidant into a first stage combustion chamber and igniting said mixture, forming a flame and products of combustion;
recirculating at least a portion of said products of combustion to a root of said flame;
removing at least a portion of first stage heat generated by said flame from said first stage combustion chamber;
introducing said products of combustion into a primary porous matrix chamber comprising a radiating material surrounding at least one heat exchanger tube containing a working fluid to be heated, thereby forming cooled products of combustion and heating said working fluid;
introducing said cooled products of combustion and at least one of a secondary combustion oxidant and an additional amount of said fuel into a second stage combustion chamber, forming a second stage flame and additional said products of combustion;
removing at least a portion of second stage heat generated by said second stage flame from said second stage combustion chamber;
introducing said products of combustion into a secondary porous matrix chamber comprising said radiating material surrounding a second stage heat exchanger containing said working fluid;
recirculating at least a portion of said products of combustion to a root of said second stage flame; and
exhausting said products of complete combustion from said secondary porous matrix chamber.

13. A method in accordance with claim 12, wherein said oxidant-to-fuel ratio of said mixture of fuel and primary oxidant is in a range of about 0.55 to about 0.95 of said stoichiometric amount required for complete combustion of said fuel.

14. A method in accordance with claim 12, wherein said primary combustion oxidant is an oxygen-containing fluid selected from the group consisting of air, oxygen, and oxygen-enriched air.

15. A method in accordance with claim 12, wherein said secondary combustion oxidant is an oxygen-containing fluid selected from the group consisting of air, oxygen, oxygen-enriched air, and flue gases.

16. A method in accordance with claim 12, wherein said products of combustion are exhausted into a condenser, resulting in removal of water vapor from said products of combustion.

17. A method in accordance with claim 16, wherein said condenser is a transport membrane condenser comprising a membrane through which said water vapor is selectively passed and contacted by a working fluid resulting in mixing of condensed water vapor with said working fluid.

18. A method in accordance with claim 17, wherein said working fluid is water.

19. A method in accordance with claim 12, wherein an amount of said secondary combustion oxidant mixed with said products of combustion results in an oxidant-to-fuel ratio in a range of about 1.0 to about 1.2 of a stoichiometric amount required for complete combustion.

20. A method in accordance with claim 12, wherein said products of complete combustion comprise less than about 7 vppm $NO_x$ at 3% $O_2$.

21. A method in accordance with claim 12, wherein said mixture of fuel and oxidant has an oxidant-to-fuel ratio less than a stoichiometric amount required for complete combustion of said fuel.

22. A method in accordance with claim 12, wherein an oxidant-to-fuel ratio of said mixture of fuel and primary oxidant is in a range of about 1.2 to about 1.5.

23. A method in accordance with claim 12, wherein said fuel introduced into said first stage combustion chamber comprises in a range of about 70% to about 95% of a total amount of fuel consumed by said method.

24. A method in accordance with claim 12, said additional amount of said fuel comprises in a range of about 5% to about 30% of a total amount of fuel consumed by said method.

25. A method in accordance with claim 12, wherein said secondary combination oxidant and said additional fuel are introduced into said second stage combustion chamber at an oxidant-to-fuel ratio in the range of about 0.1 to about 0.4.

26. A heating apparatus comprising:
at least two combustion stages comprising a combustion chamber and a porous matrix chamber; and
heat exchange means disposed in said at least two combustion stages, said heat exchange means comprising water tubes embedded in a bed of alumina refractory balls and producing a heat transfer ratio of at least 100,000 $Btu/h\text{-}ft^2$.

* * * * *